(12) United States Patent  (10) Patent No.: US 8,382,540 B2
Barnard et al.  (45) Date of Patent: Feb. 26, 2013

(54) METHOD AND APPARATUS FOR CONTROLLING THE MOTION OF AN AUTONOMOUS MOORED PROFILER

(75) Inventors: Andrew H. Barnard, Corvallis, OR (US); Bruce K. Rhoades, Corvallis, OR (US); John N. Koegler, III, Corvallis, OR (US); Alex R. Derr, Seal Rock, OR (US); Casey Moore, Corvallis, OR (US); Daniel R. Whiteman, Philomath, OR (US); Percy L. Donaghay, Saunderstown, RI (US); James M. Sullivan, Peacedale, RI (US)

(73) Assignee: Wet Labs, Inc., Philomath, OR (US)

( * ) Notice: Subject to any disclaimer, the term of this patent is extended or adjusted under 35 U.S.C. 154(b) by 1032 days.

(21) Appl. No.: 11/998,650

(22) Filed: Nov. 30, 2007

(65) Prior Publication Data

US 2008/0089176 A1  Apr. 17, 2008

(51) Int. Cl.
 *B63B 22/00* (2006.01)

(52) U.S. Cl. .................. 441/26; 254/361; 367/4; 367/89

(58) Field of Classification Search ............... 73/170.29, 73/170.31, 170.32, 170.33, 170.34; 254/266, 254/361; 367/4, 89; 441/21, 22, 23, 24, 441/25, 26, 27, 28, 29, 136, 11
See application file for complete search history.

(56) References Cited

U.S. PATENT DOCUMENTS

| | | | |
|---|---|---|---|
| 3,628,205 A | 12/1971 | Starkey et al. | |
| 3,782,692 A | 1/1974 | Casco et al. | |
| 3,906,564 A | 9/1975 | Thompson et al. | |
| 3,955,412 A | 5/1976 | Niskin | |
| 3,995,831 A * | 12/1976 | Spanski et al. | 254/361 |
| 4,191,049 A | 3/1980 | Bowditch et al. | |
| 4,196,888 A * | 4/1980 | Tande et al. | 254/361 |
| 4,216,535 A | 8/1980 | Bennett | |
| 5,102,102 A * | 4/1992 | Hidaka et al. | 254/266 |
| 5,644,077 A | 7/1997 | Fowler | |
| 5,665,909 A | 9/1997 | Doherty et al. | |
| 5,774,421 A | 6/1998 | Vincent, II et al. | |
| 5,869,756 A | 2/1999 | Doherty et al. | |
| 6,463,800 B2 | 10/2002 | Fowler | |
| 6,807,856 B1 | 10/2004 | Webb | |
| 7,040,157 B2 * | 5/2006 | Glasgow et al. | 73/170.29 |

OTHER PUBLICATIONS

Ocean Sensors; Autonomous Profiling Vehicle, pp. 1-3, Copyright 2004 Ocean Sensors, Inc., San Diego, California.

* cited by examiner

*Primary Examiner* — Lars A Olson
(74) *Attorney, Agent, or Firm* — Portland Intellectual Property, LLC

(57) ABSTRACT

A method and apparatus for controlling the motion of a cable-driven autonomous moored profiler. The profiler includes one or more buoyant members for buoying the profiler in the fluid, a winch, and a feedback controller for controlling the winch. The winch includes a spool, a device providing for varying rates of turning of the spool, and a flexible cable for winding onto and unwinding from the spool. A first end of the cable is carried by the profiler. The controller monitors an indication of the tension in the cable and controls the device in response thereto.

21 Claims, 3 Drawing Sheets

METHOD AND APPARATUS FOR CONTROLLING THE MOTION OF AN AUTONOMOUS MOORED PROFILER

GOVERNMENT RIGHTS

This invention was made with Government support under Contract Number N00014-05-C-0075 awarded by the Department of the Navy. The Government has certain rights in the invention.

FIELD OF THE INVENTION

The present invention relates to method and apparatus for controlling the motion of an autonomous moored profiler.

BACKGROUND

An autonomous moored profiler ("AMP") is a tethered platform typically used for carrying scientific measuring instruments through bodies of water for measuring characteristics of the water. Such characteristics include those of both biological and non-biological material in the water. The measuring instruments may be any combination of mechanical, electrical, optical, chemical, and biological sensors suited to the purpose. The AMP moves the measuring instruments through the water vertically, so that the measuring instruments are able to sample the water at various depths, providing a "profile" of the water.

Motion of the AMP through the water is controlled by a flexible cable. Since the cable is flexible, it can sustain only tensile forces, i.e., it can only exert pulling forces. To allow the AMP to cycle both upwardly and downwardly in the water, the AMP is made buoyant, so that there is an upwardly directed force on the AMP which acts in opposition to the tensile force carried by the cable.

The cable tethers the AMP to an anchor typically resting on the floor of the body of water, to moor the AMP. The cable is spooled on a winch which is typically onboard the AMP, and the depth of the AMP in the body of water is controlled by paying out, or reeling in, the cable by operation of the winch. Typically, while the AMP is cycled both upwardly and downwardly, measurements are made only during one-half of the cycle, i.e., either on the upward or downward stroke. It is important during the time that the measuring instruments are actively measuring the water that the AMP always travel in the same direction, preferably at a substantially constant speed.

In a calm or quiescent body of water, such control of the movement of the AMP is adequately provided simply by controlling the rate of turning of the spool, which has been the standard methodology. However, in many bodies of water, particularly the ocean, there are significant time-varying hydraulic pressure fields due to, e.g., turbulence, currents and wave orbitals. These pressure fields result in time and location dependent forces that act on the AMP in addition to the buoyant force and the force exerted by the cable. These forces can cause the AMP to stop its travel, or even to momentarily reverse itself and travel in the opposite direction. This can happen either on the upward or downward stroke. This results in un-even sampling, and where travel is stopped or reversed, can result in double-sampling, making some data unreliable or redundant and making interpretation of all the data more difficult.

The prior art has had two responses to this problem. One response has been to increase the buoyant force. If the buoyant force is large, then the forces produced by the pressure fields must also be large to cause the AMP to slow or change course.

A significant problem with this approach, however, is that to cycle the AMP, a power source is required to pull the AMP to maximum depth on its downward stroke. The larger the buoyant force, the more power is required. Where the power source is on-board the AMP as is preferred, increasing the power requirements either decreases the time that the AMP can provide for unattended service, or increases weight, which makes the AMP more difficult to deploy.

The other prior art response has been simply to use non-autonomous methods for profiling bodies of water with significant pressure fields, such as the ocean. For example, for profiling the ocean, the measuring instruments have typically been floated to the desired location in a boat, and manually lowered and then raised to obtain the measurements by personnel or equipment in the boat.

Accordingly, there is a need for a method and apparatus providing for improved control of the motion of an autonomous moored profiler.

SUMMARY

A method and apparatus for controlling the motion of an autonomous moored profiler for profiling a volume of fluid, such as a body of water, is disclosed. The profiler includes one or more buoyant members for buoying the profiler in the fluid, a winch, and a feedback controller for controlling the winch. The winch includes a spool, a device providing for varying rates of turning of the spool, and a flexible cable for winding onto and unwinding from the spool. A first end of the cable is carried by the profiler. The controller monitors an indication of the tension in the cable and controls the device in response thereto.

Preferably, the feedback controller is adapted to control the device on at least one of (a) ascent so that, if the tension in the cable is increased, the device increases the rate of turning of the spool, and if the tension in the cable is decreased, the device decreases the rate of turning of the spool, and (b) descent, so that, if the tension in the cable is increased, the device decreases the rate of turning of the spool, and if the tension in the cable is decreased, the device increases the rate of turning of the spool.

A method for autonomously profiling a volume of fluid is also disclosed. According to the method, a buoyant platform is provided that carries one or more measuring instruments adapted to measure one or more selected characteristics of the fluid. The platform is pulled with a force exerted through a flexible cable that is attached to the platform. An indication of the tension in the cable is monitored, and the force is varied in response.

Preferably, the force is varied so that, if the tension in the cable is increased, the force is decreased, and if the tension in the cable is decreased, the force is increased.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

DETAILED DESCRIPTION OF PREFERRED EMBODIMENTS

Reference will now be made in detail to specific preferred embodiments of the invention, examples of which are illustrated in the accompanying drawing.

Figure 1:
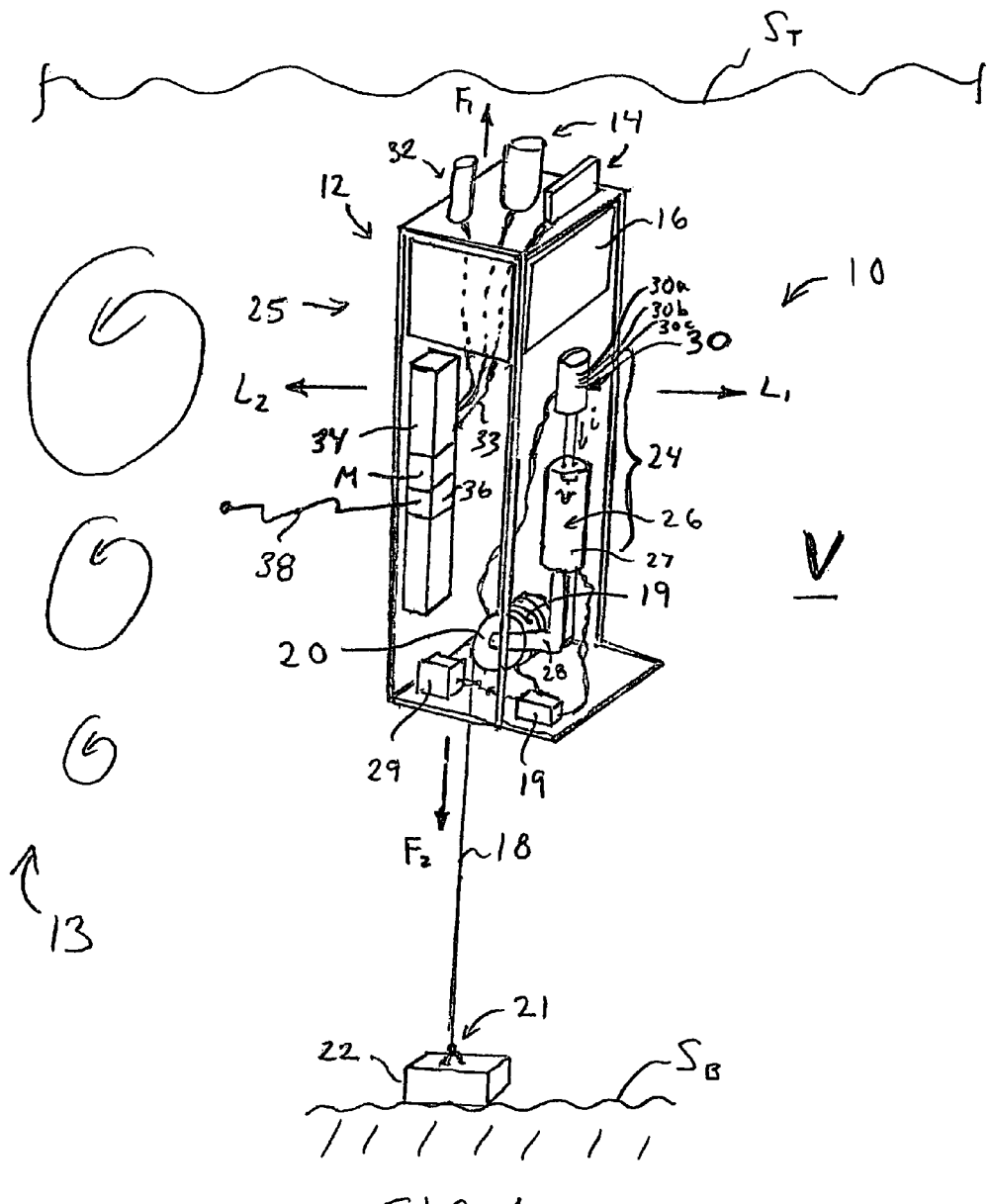
FIG. 1 is a pictorial schematic view of an autonomous moored profiler according to the present invention.

FIG. 1 shows an autonomous moored profiler 10 according to the present invention submerged in a volume "V" of water. The water has a top surface "$S_T$" and is supported by a bottom surface "$S_B$" such as the sea-floor. The profiler 10 is provided for sampling the water at various depths. To that end, the profiler 10 includes a platform 12 that carries one or more measuring instruments 14 adapted to measure selected characteristics of the water. More precisely, the measuring instruments measure characteristics, i.e., quantity and/or quality, of matter in the water, which may be organic or inorganic, dissolved or undissolved. The profiler 10 is typically used in oceanographic research, and typical characteristics that are of interest and therefore measured by the measuring instruments are temperature, pressure, conductivity, dissolved oxygen concentration, water currents, chlorophyll concentration, turbidity, colored dissolved organic matter content, optical properties (e.g., absorption, beam attenuation, scattering, backscattering coefficients), irradiance and radiance, nutrient concentrations, etc. Any such characteristics will be understood for purposes herein to be characteristics of the water.

The profiler 10 is moved through the body of water, both upwardly, toward the surface of the water, and downwardly. To move the profiler upwardly, the platform 12 includes one or more buoyant members 16 sufficient to buoy the profiler 10 in the body of water, i.e., to provide an upwardly directed force sufficient raise the profiler 10, fully loaded with the measuring instruments 14, to the surface of the water.

To move the profiler 10 downwardly, the platform 12 is tied to a flexible cable 13 having a first end 19 that is carried by the platform, and the cable is caused to exert a tensile, pulling force on the platform. The profiler is controllably moved through the water by paying out, or reeling in, the cable. Paying out the cable allows the profiler to rise toward the surface of the water in response to the buoyant force, while reeling in the cable pulls the profiler to greater depths.

For this purpose, the cable 18 is spooled on a spool 20. The spool 20 is preferably carried on or by the platform 12, however this is not essential. When the spool 20 is carried by the platform 12 as in the profiler 10, a second end 21 of the cable 18 is anchored at a selected depth in the body of water. The end 21 can be anchored to any existing edifice, natural or man-made, that is at a fixed depth in the water. Typically, an anchor 22, dropped into the water from a boat, is provided for this purpose, however, the cable end 21 may otherwise be tied or connected to an existing structure in the water. If the spool 20 is not carried by the platform, the spool may form part of the anchor 22.

The spool 20 is controllably rotated, or controllably allowed to rotate, by a control device 24. Control of the rate of rotation of the spool 20 is particularly important when measurements are being taken by the measuring instruments 14.

The control device 24 may include a simple brake that provides a controlled braking force to counteract the buoyant force provided by the buoyant members 16, to control ascent. However, as mentioned above, it is desired to cycle the profiler 10 and thus to provide for both ascending and descending movements through the body of water. Accordingly, the preferred control device 24 includes a motive device 26 such as an engine or motor.

The motive device 26 may be powered by any known energy source, e.g., electricity, chemical fuel, solar energy, thermal energy, and mechanical energy which may be produced by currents and waves in or on the water, and which may be utilized as generated or stored for later use. The preferred motive device 26 is an electric motor 27 powered by a battery 29. In the preferred embodiment, the motor 27 drives the spool 20 directly through a gearset 28, but any power transmission device(s) may be used. All of the foregoing components are preferably carried by the platform 12.

Preferably, the measuring instruments 14 are carried by the platform at or near the top 25 of the profiler 10, and the measuring instruments are activated to make measurements as the profiler ascends through the water. In the presence of time-varying pressure fields 13 (here drawn as wave orbitals), the profiler will in general be subjected to time and location dependent forces in all directions, e.g., upwardly and downwardly directed forces $F_1$ and $F_2$, and laterally directed forces $L_1$ and $L_2$.

Analogous to a kite, the tethered profiler 10 is less prone to lateral wandering as it rises, following the buoyant force, than when it is pulled down, against the buoyant force, which requires greater tension in the cable. Therefore, it is considered preferable for the measuring instruments 14 to make measurements during ascent of the profiler. In that circumstance, it is beneficial to place the measuring instruments at or near the top of the profiler so that there is minimum structure above the instruments to interact with the water about to be measured.

On the other hand, measuring during descent also has an advantage. Since the cable 18 can only transmit tensile forces, the profiler cannot be controlled by the cable when the tension is zero. This circumstance is more likely to occur during ascent than during descent, since only downwardly directed forces will tend to decrease the tension, and during descent, downwardly directed forces act in the direction that the profiler is already traveling. This advantage is rendered relatively unimportant by the control provided by the present invention.

However, it should be understood that the measuring instruments could be carried by the platform near or at the bottom of the profiler, where they would preferably be active during descent of the profiler, and otherwise may be disposed anywhere in or on the profiler 10 and active during either or both ascent and descent if desired.

In a quiescent body of water, the vertical movement of the profiler is determined by the tensile force in the cable 18 as produced by the motive device 26, on the one hand, and the sum of the oppositely directed buoyant force provided by the buoyant members 16, and a drag force resulting from the motion of the profiler through the water, on the other. As a result, the profiler will move either upwardly or downwardly at an equilibrium, constant velocity under this ideal circumstance.

However, the invention provides for reliably autonomously profiling bodies of water that are not quiescent and that may include significant time-varying pressure fields. According to the invention, the control device 24 includes a feedback controller 30 used to control the motive device 26. For the electric motor 27, the controller 30 provides for a programmable, constant preset drive current "i." For feedback, the control device 24 utilizes a current measuring, device 19 that produces an output that is provided to the controller 30. The controller 30 outputs a drive voltage "v" for driving the motor in response so as to maintain the current at the preset value. A typical preset value of the drive current for ascent, if measurements are being made, ranges from zero to 0.7 amps, resulting in typical average speeds for the profiler 10 of 20 cm/sec.

The drive current is proportional to the torque produced by the motor 27, which in turn is proportional to the tension in the cable 18. Therefore, a constant drive current will produce a constant tension in the cable, and so a constant velocity in quiescent water.

In non-quiescent water, whether measurements are made during ascent or descent of the profiler 10, the tension may be increased as a result of a transient upwardly directed force. This causes the drive current to increase, and the controller 30 reduces the voltage applied to the motor in response to maintain the drive current at its preset value. Similarly, the tension may be decreased as a result of a transient downwardly directed force. This causes the drive current to decrease, and in response the controller 30 increases the voltage across the motor.

More generally, according to the invention, the controller 30 controls the motive device (or brake), so that if the tension in the cable is increased by an externally applied force, the motive device 26 is caused to compensate by decreasing the applied force on the cable, and if the tension in the cable is decreased, the motive device compensates by increasing the applied force. Thus the tension in the cable is maintained substantially constant within the capabilities of the controller.

If the profiler is ascending and the tension in the cable is reduced to zero, the motive device 26 is preferably controlled to stop translation of the cable to allow the buoyant force to re-establish tension. If the tension in the cable remains zero for a predetermined period of time, it may be inferred that there exists a length of slack cable which would be desirable to rewind. Then, the motive device would preferably be controlled to reverse direction of the spool 20 and reel in the cable until a non-zero tension is re-established. These actions allow the establishment of tension as soon as possible and minimize the risk that knots form in the cable or the cable back-wraps on the spool.

If it is desired to control the tension in the cable as the profiler is descending and the tension in the cable is reduced to zero, the motive device 26 would be controlled to turn the spool faster until tension is re-established.

Figure 2:
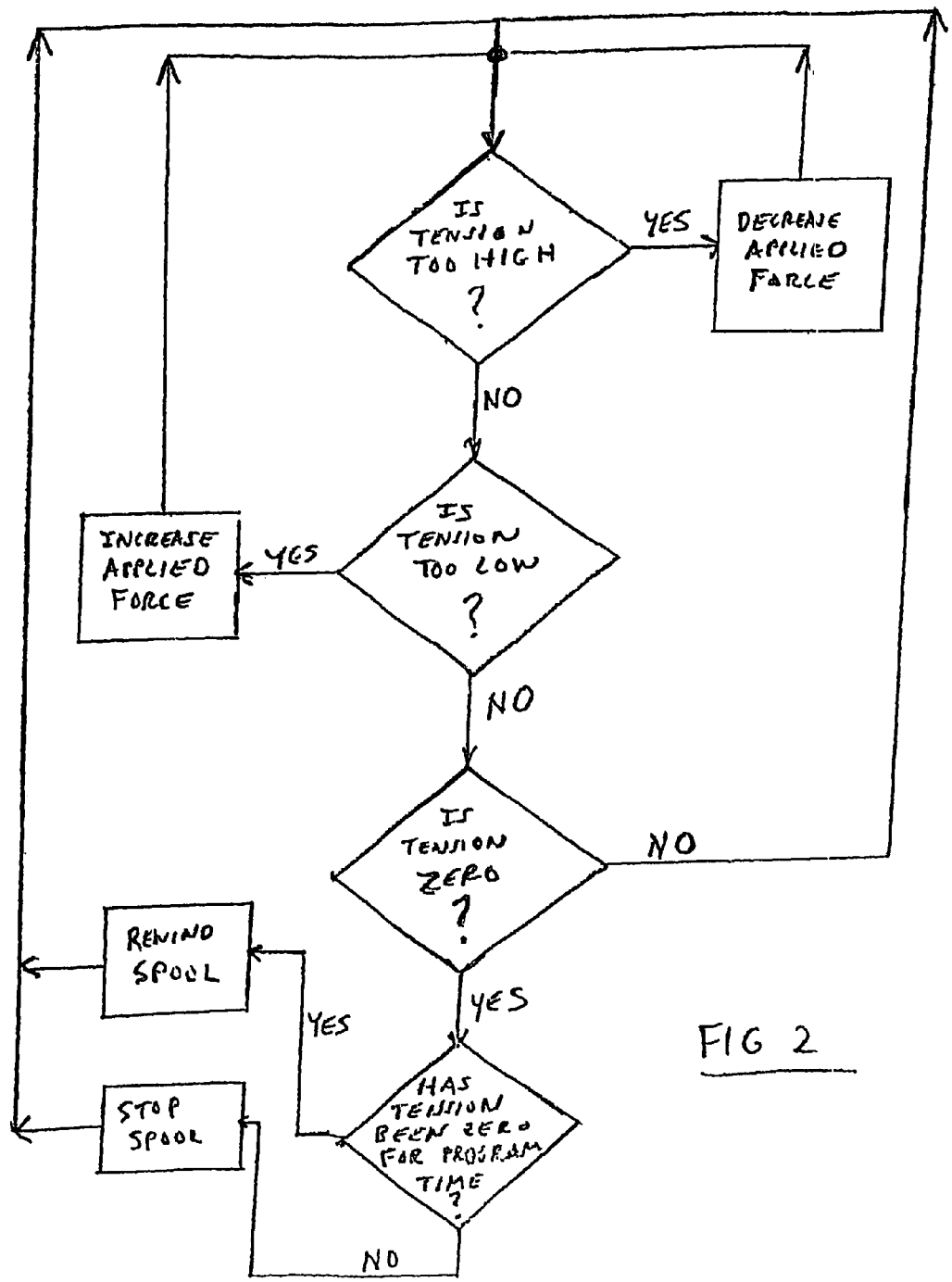
FIG. 2 is a flow chart of a preferred program for controlling the motion of the autonomous moored profiler of FIG. 1.

Preferably, the controller 30 is adapted to provide such control via programming, and therefore includes a CPU 30a, a memory 30b, and a clock 30c, for entering and executing instructions in accord with the aforementioned scheme according to standard practice. FIG. 2 is a flow-chart of the preferred programming, for controlling the motive device 26 during ascent.

The present inventors have recognized an additional problem that if the cable 18 is formed of a relatively stiff material, such as braided stainless steel, it tends to loosen its grip around the spool 20 in response to such slackening, resulting in a further degradation in motion control. This tendency is indicated by the "bend radius" of the cable, where a large bend radius makes it easier for the cable to lose frictional contact with the spool. Preferably, the cable 18 is formed so that it has a minimum bend radius, allowing a minimum diameter spool which both further enhances control and minimizes the size and weight of the profiler.

The decreased tensile requirements according to the invention as a result of decreased buoyant force permit use of a cable having a smaller bend radius regardless of the materials and construction methodology employed. However, best results have been obtained utilizing a plastic braided rope manufactured and marketed by Cortland Puget Sound Rope of Anacortes WA ("PSR") under the trademark PLASMA. It is produced by post-processing ultra-high molecular weight polyethylene fibers manufactured by Honeywell and marketed under the trademark SPECTRA. As best understood, the post-processing performed by PSR subjects the fibers to controlled tension at elevated temperature, substantially as described in U.S. Pat. Nos. 5,290,500 and 5,351,373.

Figure 3:
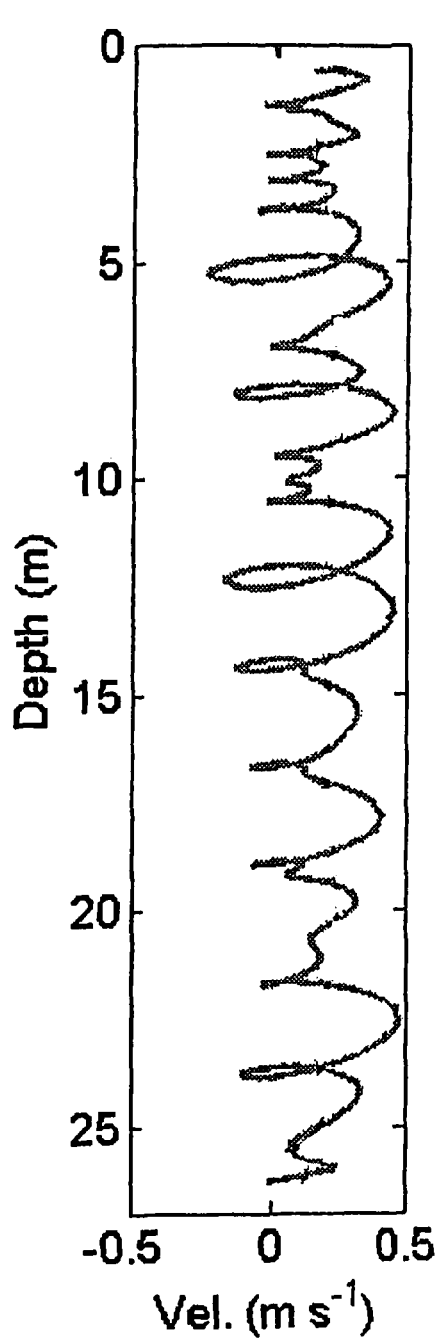
FIG. 3 is a plot of depth versus velocity for an autonomous moored profile utilizing prior art motion control.
Figure 4:
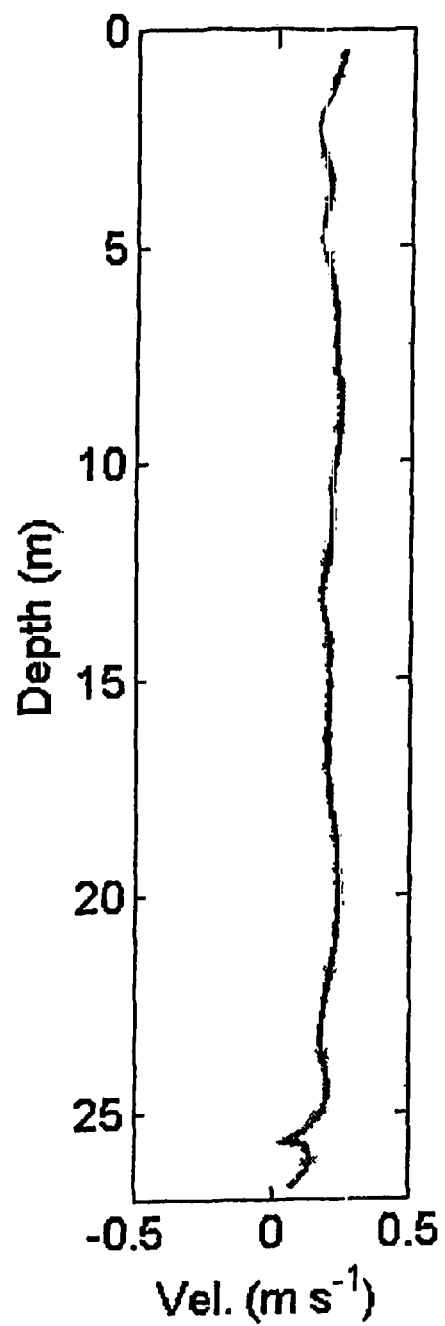
FIG. 4 is a plot of depth versus velocity for an autonomous moored profiler utilizing motion control according to the present invention.

FIGS. 3 and 4 illustrate the outstanding efficacy of the invention. FIG. 3 is a plot of depth versus velocity for an autonomous moored profiler utilizing a buoyant force of 20 pounds, the preferred cable 18 described above having a diameter of about 0.07", and motion control as provided in the prior art, i.e., the spool 20 is rotated at a constant speed. This plot can be compared with FIG. 4, which is a plot of the same parameters utilizing control according to the present invention, in this particular instance a constant drive current as maintained by a feedback controller. Whereas in FIG. 3 the velocity can be seen to vary considerably and it is apparent that the profiler repeatedly reversed direction, the velocity in FIG. 4 is approximately constant over the range of the profiler, demonstrating an outstanding improvement in motion control. Alternatively, for a given degree of control, the present invention provides for a smaller buoyant force, decreasing weight and power consumption.

As mentioned above, the velocity control described above is important when measurements are being taken. As will also be readily appreciated, the desired speed of the profiler 10 is related to the response time of the measuring instruments 14. For example, a measuring instrument using chemistry to perform a measurement may require 10 seconds, or even as much as 60 seconds, to perform a measurement. If it is desired to measure within a given volume of water, the vertical movement of the AMP must be slow enough to ensure that the measurement is both initiated and completed within that volume.

Where measurements are taken only during ascent as is preferred, it has been found that it conserves the on-board energy supply to the motive device 26 to provide for descent at maximum velocity, and that control is not otherwise important. In the preferred embodiment, the controller 30 typically provides to the motor 27 drive currents of 4-5 amps on descent, and ramps the drive current from zero to the programmed drive current at a programmable rate, e.g., 4 amps/second.

The profiler 10 includes a depth sensor 32 which provides a signal to the controller 30 indicating the depth. The controller 30 is programmable to cause the motive device, or brake, to stop vertical travel of the profiler, either upwardly or downwardly or both, at respective predetermined values of the depth.

The measuring instruments 14 preferably provide output data to a data acquisition computer 34 on-board the profiler 10, which merges this output data with depth data obtained by the depth sensor 32, for referencing the measurement data obtained with the measuring instruments 14. In addition, the depth sensor 32 preferably includes additional sensors for sensing the conductivity and temperature of the water, and these data are also output to the data acquisition computer 34 for correlation with the output data from the measurement instruments.

The data collected by the measuring instruments 14 and the depth sensor 32 are communicated over a bus 33 to the computer 34 where they may be stored in a memory storage device "M" and/or transmitted by a data transmitter 36 over a wireless link 38 to a remote computer (not shown). Other well known data management and communication strategies may be employed as desired.

It will be readily appreciated that the principles of the invention may be applied to the profiling of any fluid, i.e., any liquid or gas, and may be of particular benefit in profiling the atmosphere.

As can be seen from the foregoing detailed description, the improved control provided by the invention permits decreased power consumption, lighter weight, and more reliable sampling, especially in bodies of water that are not quiescent.

It is to be understood that, while a specific method and apparatus for controlling the motion of an autonomous moored profiler has been shown and described as preferred, other configurations and methods could be utilized, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. An autonomous moored profiler for profiling a volume of fluid, comprising:
one or more buoyant members for buoying the profiler in the fluid;
a winch, said winch including a spool, a device providing for controlled rates of turning of said spool, and a flexible cable for winding onto and unwinding from said spool, a first end of said cable being carried by the profiler; and
a controller for controlling said device so as to vary said rate in response to changes in the tension in said cable, for maintaining the tension in the cable substantially constant within the capabilities of the controller.

2. The profiler of claim 1, further comprising one or more measuring instruments for measuring one or more selected characteristics of the fluid.

3. The profiler of claim 2, wherein said controller is adapted to control said device on at least one of (a) ascent so that, if the tension in the cable is increased, the device increases the rate of turning of said spool, and if the tension in the cable is decreased, the device decreases the rate of turning of said spool, and (b) descent, so that, if the tension in the cable is increased, the device decreases the rate of turning of said spool, and if the tension in the cable is decreased, the device increases the rate of turning of said spool.

4. The profiler of claim 3, wherein said controller is adapted to control said device to maintain a substantially constant tension in the cable.

5. The profiler of claim 3, wherein said winch is carried by the profiler.

6. The profiler of claim 3, wherein said device is an electric motor, wherein said indication is the drive current in said motor, and wherein said controller controls said drive current.

7. The profiler of claim 3, wherein said controller is adapted to control said device so that it ceases to turn said spool if the tension in said cable is zero.

8. The profiler of claim 7, wherein said controller is adapted to control said motive device so that it reverses direction if the tension in said cable remains zero for a predetermined period of time.

9. The profiler of claim 7, wherein said device is an electric motor, wherein said indication is the drive current in said motor, and wherein said controller controls said drive current.

10. The profiler of claim 9, wherein said controller is adapted to control said motive device so that it reverses direction if the tension in said cable remains zero for a predetermined period of time.

11. The profiler of claim 4, wherein said winch is carried by the profiler.

12. The profiler of claim 11, wherein said device is an electric motor, wherein said indication is the drive current in said motor, and wherein said controller controls said drive current.

13. A method for autonomously profiling a body of fluid, comprising the steps of:
providing a buoyant platform submerged in the fluid and carrying one or more measuring instruments for measuring one or more selected characteristics of the fluid;
pulling on the platform by pulling on a flexible cable attached thereto, so as to either (a) cause the platform to descend through the fluid, or (b) resist ascension of the platform through the fluid caused by the platform's buoyancy;
monitoring an indication of the tension in the cable in the course of said descent or ascension; and
automatically varying the rate of said pulling in response to changes in the tension in the cable determined by said step of monitoring, for improving the platform's resistance to changes in the rate of descent or ascension in response to varying pressure fields in the fluid.

14. The method of claim 13, wherein the rate of said pulling is varied depending on whether the platform is in said descent or ascension so that, if the platform is ascending and the tension in the cable increases, the rate of said pulling is increased whereas if the tension in the cable decreases, the rate of said pulling is decreased, and if the platform is descending and the tension in the cable increases, the rate of said pulling is decreased whereas if the tension in the cable decreases, the rate of said pulling is increased.

15. The method of claim 14, said pulling is caused by an electric motor, and wherein said step of varying varies the drive current to said motor.

16. The method of claim 14, wherein said pulling includes turning a spool on which said cable is at least partially wound, wherein said step of varying includes causing said spool to cease turning if the tension in said cable is zero.

17. The method of claim 16, wherein said step of varying further includes causing said spool to turn in the reverse direction if the tension in said cable remains zero for a predetermined period of time.

18. The method of claim 16, further comprising providing an electric motor to cause said turning, wherein said step of monitoring monitors the drive current in said motor, and wherein said step of varying varies the drive current in said motor.

19. The method of claim 18, wherein said step of varying further includes causing said spool to turn in the reverse direction if the tension in said cable remains zero for a predetermined period of time.

20. The method of claim 13, further comprising measuring said one or more characteristics in the course of said descent or ascension.

21. The method of claim 14, wherein said step of varying provides for substantially constant tension in the cable, during which time at least two distinct measurements are made with the same one of said one or more measuring instruments.

* * * * *